United States Patent [19]

Travaglini

[11] Patent Number: 5,731,014
[45] Date of Patent: Mar. 24, 1998

[54] MODULAR INJECTION MOLD ASSEMBLY

[75] Inventor: Nicola Travaglini, Woodbridge, Canada

[73] Assignee: Tradesco Mold Limited, Rexdale, Canada

[21] Appl. No.: 649,169

[22] Filed: May 17, 1996

[51] Int. Cl.$^6$ ................................................ B29C 45/40
[52] U.S. Cl. .................... 425/190; 264/334; 425/556; 425/DIG. 5
[58] Field of Search ...................... 425/548, 556, 425/413, 414, 422, 441, DIG. 221, 436 RM, 443, 444, 554, 125, 190, DIG. 5; 264/257, 334

[56] References Cited

U.S. PATENT DOCUMENTS

| | | | |
|---|---|---|---|
| 4,124,352 | 11/1978 | Pasch | 425/556 |
| 4,162,138 | 7/1979 | Byrne | 425/125 |
| 4,497,624 | 2/1985 | Brun et al. | 425/548 |
| 5,565,223 | 10/1996 | McCready et al. | 425/556 |

*Primary Examiner*—Tim Heitbrink
*Attorney, Agent, or Firm*—Rogers & Milne

[57] ABSTRACT

A modular injection mold assembly having a core part with an ejector box side securable to a mold base and a core side presenting a first mold face on an outer surface. The assembly further includes a cavity part presenting a second mold face mountable opposite the first mold face. An ejector assembly is mounted within the ejector box side of the core part and has a base member and at least one ejector pin extending from the base member through the core. The ejector assembly is movable relative to the core between a retracted position in which an outer end of each of the ejector pins forms part of the first mold face and an extended position wherein the outer end of each of the ejector pins protrudes from the first mold face. The base member of the ejector assembly further includes a cam follower for causing the ejector assembly to move from the retracted position to the extended position in response to input from a cam mounted to either the mold base or the core. The mold assembly is removable from the mold base as a unit with the ejector assembly and exchangeable for another mold assembly without removal of the ejector pins from the core part.

5 Claims, 10 Drawing Sheets

MODULAR INJECTION MOLD ASSEMBLY

FIELD OF THE INVENTION

This invention relates to plastic injection molds and more particularly to mold assemblies utilizing ejector pins for stripping of injection molded parts from the molds and the actuating mechanisms for such pins.

BACKGROUND

Figure 1:
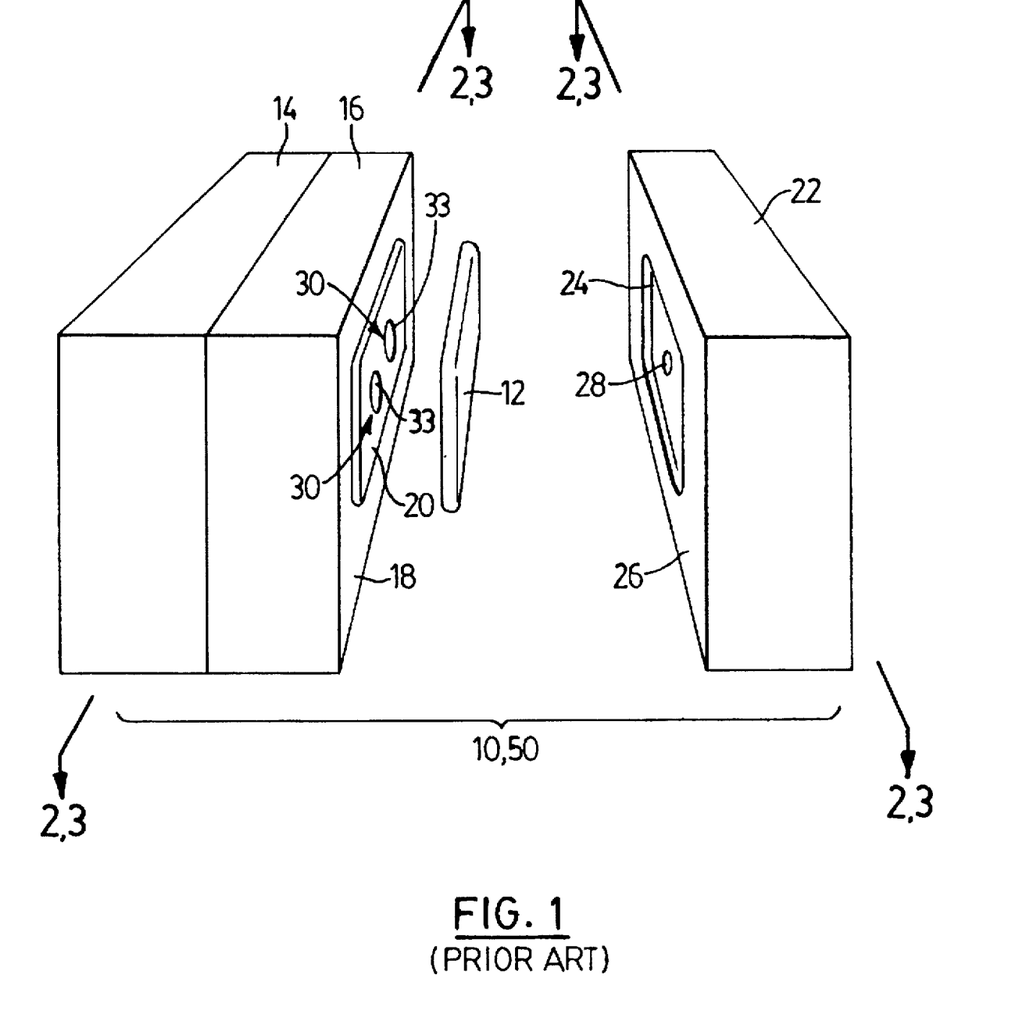
FIG. 1 is a perspective view of a typical injection molding apparatus.
Figure 2A:
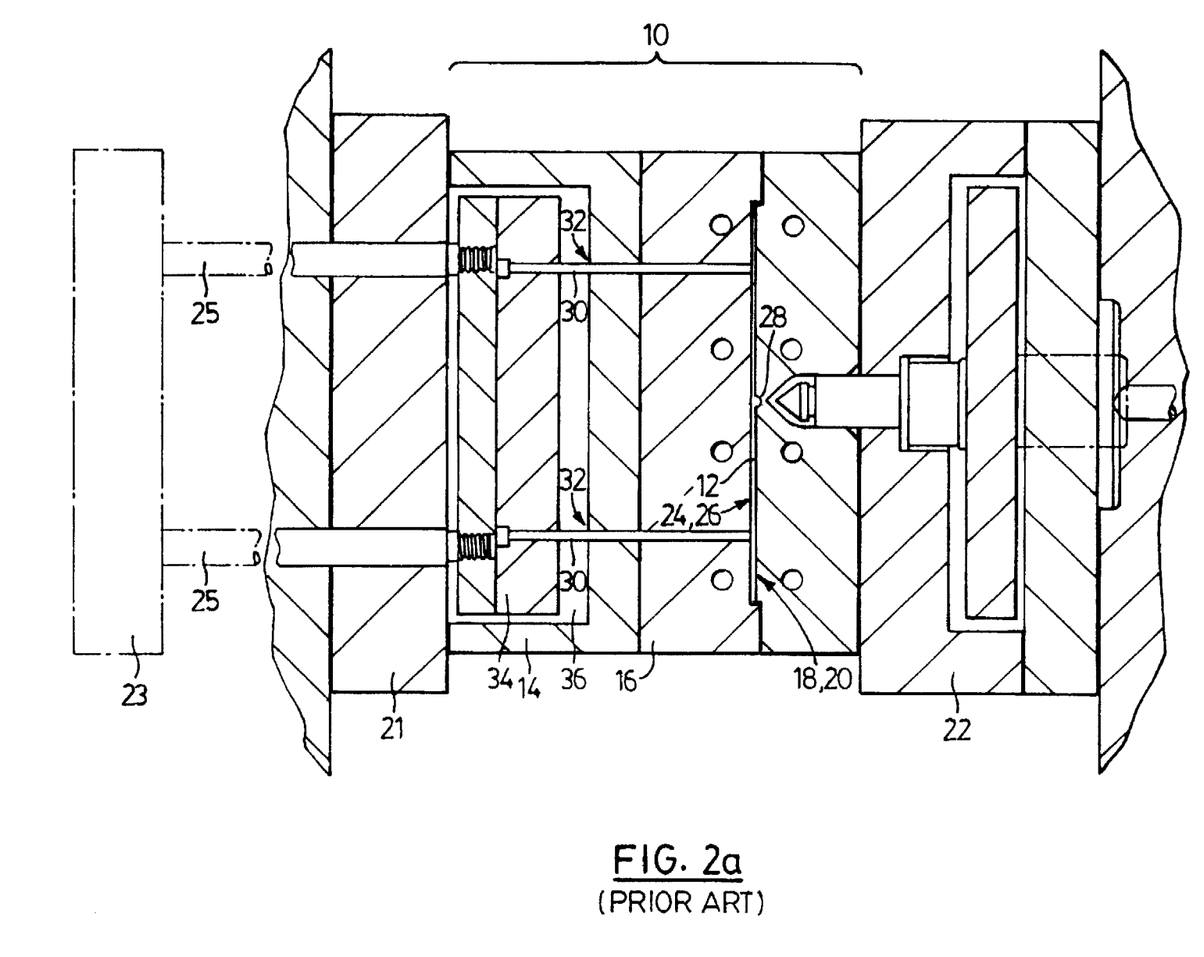
FIG. 2a is a cross-sectional view taken on line 2—2 of FIG. 1 of a prior art injection molding apparatus.

FIG. 1 is a perspective view illustrating a typical injection molding apparatus at reference 10. FIG. 2a is a cross-section on line 2—2 of FIG. 1 through a typical prior art injection molding apparatus.

An injection molding apparatus 10 for molding a part 12 includes a mold base 14 to which is rigidly secured a "core" 16. The injection molding apparatus 10 is mounted to and used with a molding press which for clarity is not illustrated but is well known in the art. The core 16 has an outer surface 18 which presents a first mold face 20. The shape of the first mold face 20 will depend on the shape of the part 12 to be formed. The mold base 14 is affixed to a movable platen 21 which forms part of the molding press.

Mounted opposite the mold face 20 is another part of the mold called a "cavity" which is identified by reference 22. The cavity 22 has a second mold face 24 on an outer face 26 opposite the mold face 20. The cavity is secured to a fixed end of the molding press.

In use, the platen 21 is moved toward the fixed end of the molding press to press the core 16 up against the cavity 22 with the respective outer surface 18 and outer face 26 touching. In this manner, a recess having a shape corresponding to that of the part 12 is defined between the first and second mold faces 20 and 24 respectively.

Molten plastic is injected into the recess through an injection "gate" 28 in the cavity 22 to fill the recess. Once the molten plastic cools and solidifies to a suitable degree, the platen 21 is withdrawn to separate the core 16 and the cavity 22. The part 12 will usually shrink onto and remain with the core 16.

One method to remove or "strip" the part 12 from the core is to apply force to the part by the use of retractable ejector pins 30. The ejector pins 30 are usually cylindrical members which extend through cylindrical apertures 32 of marginally larger diameter from an ejector plate 34 mounted within the mold base 14. The cylindrical apertures 32 extend between the first mold face 20 and an ejector plate recess 36 within the mold base 14. The ejector plate recess 36 houses the ejector plate 34.

To strip the part 12, the ejector plate 34 is moved toward the core 16 thereby causing the ejector pins 30 to move from a retracted position wherein outer ends 33 of the ejector pins are flush with the first mold face 20 to an extended position wherein the outer ends 33 of the ejector pins 30 protrude from the first mold face 20 to in turn push the part 12 away from the first mold face 20.

Typically a molding press is equipped with an ejector box (not shown) which is movable with the platen 21. The ejector box contains a knock-out plate 23 connected to the ejector plate 34 by knock-out rods 25 which extend through the platen 21 and threadedly engage the ejector plate 34. The knock-out plate 23 is movable relative to the platen, usually by hydraulic means to cause the knock-out rods to move the ejector plate 34 to move the ejector pins 30.

Various other mechanisms may be used to move the ejector plate 34. Some of the mechanisms rely on the back

2 and forth movement of the mold base 14 and core 16 as the mold opens and closes. In these mechanisms, movement of the ejector plate 34 is restrained as the mold base 14 and core 16 move thereby causing relative movement between the ejector plate 34 and the mold base 14 and in turn the core 16.

Hydraulic actuators require a fair amount of space and are accompanied by the risk of hydraulic fluid leakage onto the mold faces 20 and 24 and the finished part 12. Pneumatic actuators may be used but offer significantly less force for a given size as compared to hydraulic actuators, are more difficult to balance, and are less controllable, tending to be somewhat sudden in operation.

To avoid marks on the part 12 associated with the use of ejector pins 30, the clearance between the ejector pins 30 and the apertures 32 is generally made quite small to avoid molten plastic seepage past the ejector pins 30 which will be present as "flash" on the part 12. Furthermore there is usually no bevel or chamfer at the outer ends 33 of the ejector pins 30.

In order to work effectively, the ejector pins 30 must be strategically placed to press on certain locations on the part 12. Because of the strategic placement of the ejector pins 30 and the fact that the pins remain in the mold base 14, exchanging one mold core 16 for another in the above arrangement is restricted to rare situations where different parts 12 having identical ejector pin placement are involved. Even in this situation, mounting the exchanged core 12 onto the mold base 14 may prove exceedingly difficult because of the tight clearances, the necessity to avoid chipping the ends 33 of the ejector pins 30 and the possibility that a dozen or more ejector pins 30 may be involved.

In summary, use of the above prior art stripping mechanism requires, in most applications, that a new mold core 16 also be accompanied by a new mold base 14 with suitable ejector pin placement. This presents disadvantages both in cost and in the downtime required to change over a molding machine from one part to another.

The above description provides a background primarily on conventional single-level molds having single or multiple cores opposite single or multiple cavities. More recently mold assemblies have been developed having more than one set of laterally adjacent cores and cavities which are therefore referred to as "stack" molds.

Figure 2B:
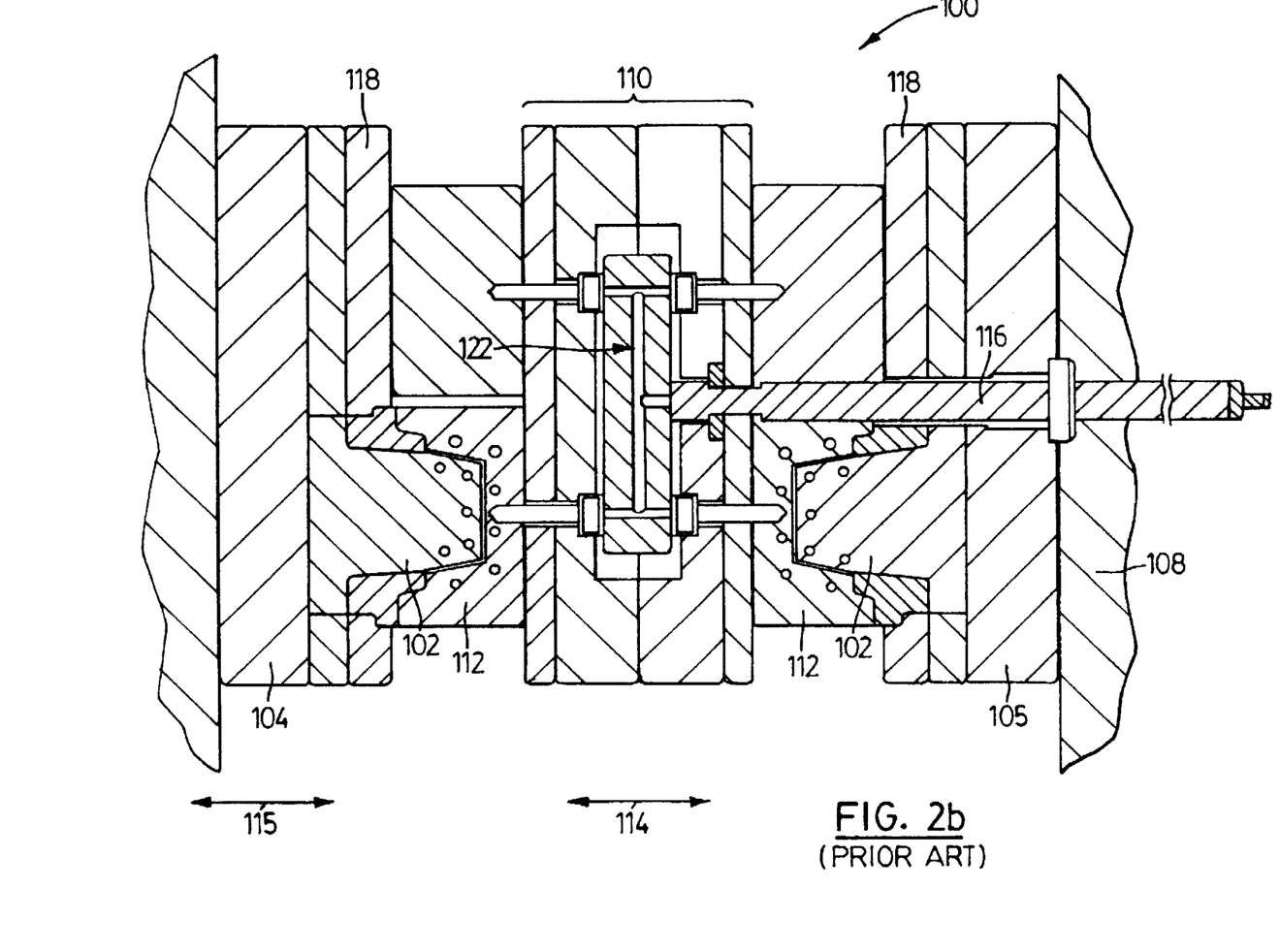
FIG. 2b is a schematic illustration of a two-level stack mold.
Figure 2C:
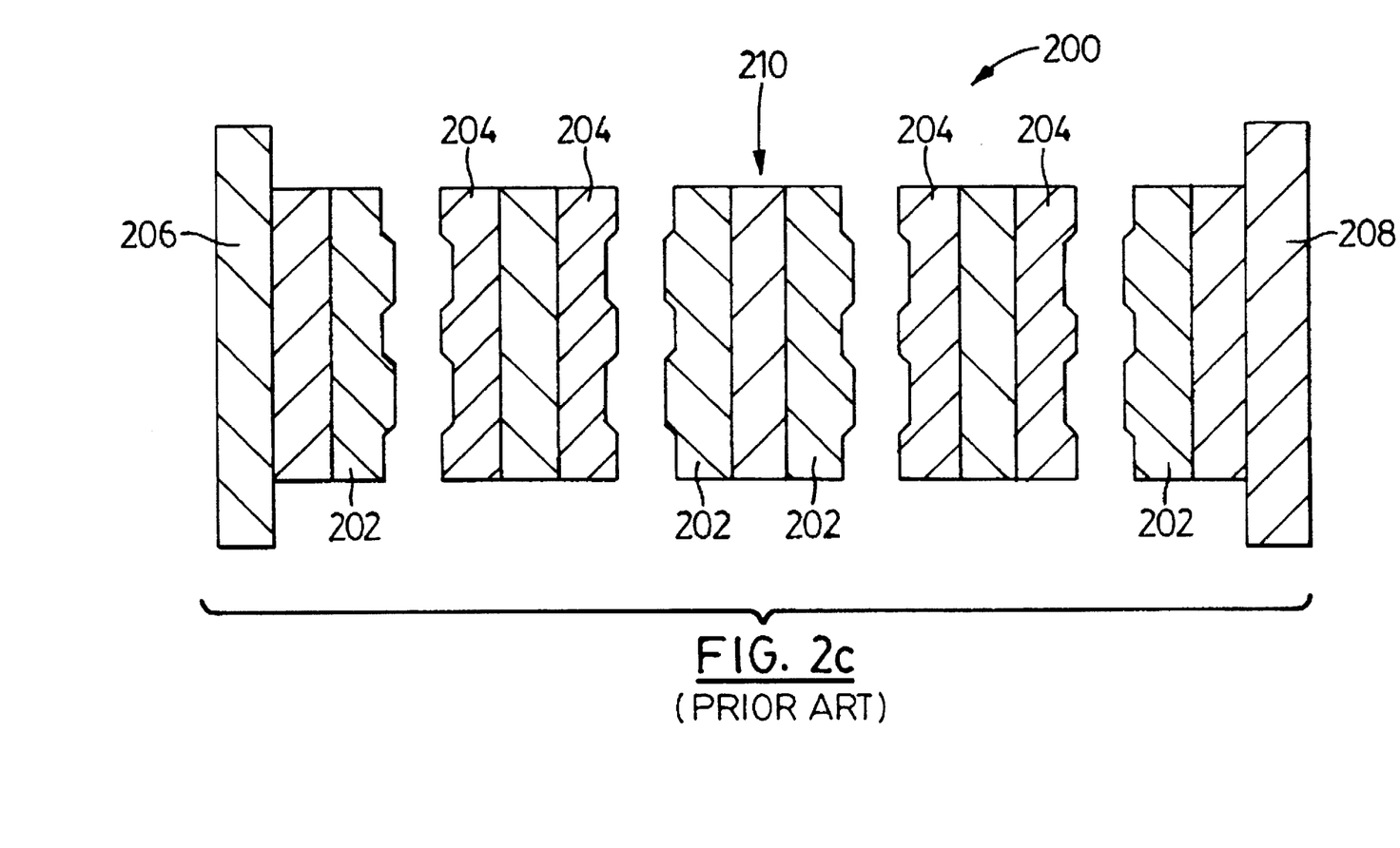
FIG. 2c is a schematic illustration of a four level stack mold.

FIG. 2b schematically illustrates a typical two level stack mold 100. FIG. 2c schematically illustrates a typical four level stack mold 200. The two level stack mold 100 has a core 102 attached to a mold base 104 and a core 102 attached to a mold base 105. The mold base 104 is affixed to a movable platen 106 of a molding press. The mold base 105 is attached to a stationary end 108 of the molding press. An intermediate member 110 carries a pair of cavities 112 facing the cores 102. The intermediate member is laterally movable in the direction of arrows 114 at a rate half that of the platen and coinciding with movement of the platen 106. When the platen 106 is moved to the right as illustrated in the direction of arrows 115, the cores 102 are pressed up against the cavities 112. When the platen 106 is moved to the left the cores 102 and cavities 112 are separated by equal amounts on either side of the intermediate member 110.

Molten plastic is injected from the stationary end 108 through a sprue bar 116 which fluidly communicates with a runner system generally identified by reference 122 for delivering molten plastic through the cavities 112 into the spaces between the cavities 112 and the cores 102. The sprue bar 116 extends through the right hand side (as viewed in FIG. 2b) core 102 and cavity 112.

Although a two level stack mold can produce product at roughly twice the rate possible with a non-stacked mold, mold costs are considerably higher because of the introduction of two sets of cores 102 and cavities 112 and the requirement for a heated runner system 122 to enable molten plastic to reach the set of cores 102 and cavities 112 distal the stationary end 108 of the molding press. Apparatus costs are also increased by the requirement to provide an ejector apparatus at the stationary end 108 of the molding press which ordinarily does not have an ejector box.

A four level stack mold such as the mold 200 in FIG. 2c virtually quadruples the output of a molding machine by providing four sets of cores 202 and cavities 204 between a platen 206 and a stationary end 208 of a molding press. As the four level stack mold introduces an intermediate set of cavities 210, it is necessary to provide a further ejector apparatus associated with the central set of cavities 210. The type of ejector apparatus must of course fit within the available space.

The maximum amount of travel for the platen of a molding press is predetermined by the design and dimensions of the molding press. For a two level stack mold, this is of some significance with respect to the size of the parts that can be produced and the space available for mounting an ejector assembly at the stationary end of the molding press. On a four level stack mold, space is at a premium and ejector assemblies should therefore be of a design that consumes as little of the available space as possible and which can be readily adapted to the central set of cavities. The space for mounting ejector assemblies within a mold increases the space required.

Certain molded articles such as lids and containers of suitable dimensions can be ejected with pressurized air and/or stripper plates such as the stripper plates illustrated at references 118 in FIG. 2b. The stripper plates act about the circumference of a suitable ridge or flange on the part to be stripped rather than ejector pins. This provides not only a space advantage but also allows quick product changes as core and cavity modules can be changed over with the mold base remaining in the molding press. This saves considerable time when changing the molds as it allows water, air and hydraulic lines to remain connected and avoids electrical wiring changes. The mold cost is also significantly reduced as core and cavity modules can be replaced without replacing the entire mold. Accordingly, smaller volumes become economical because of the reduced downtime and capital investment.

Providing a quick product change assembly for products requiring ejector pins is complicated by space limitations, ejector pin location and ejector pin actuation. Ideally force should be applied to the ejector plate to "push" directly behind the ejector pins. Even with a conventional non-stacked mold, this often requires a degree of compromise because of the limited number of placement points where knock-out rods 25 in FIG. 2a may be inserted through the platen 21 to connect to the knock-out plate 23. If the mold base 14 contains a single ejector plate 50 this usually will not present too much of a problem as placement points can often be selected which, even if not directly behind the ejector pins, avoid subjecting the ejector plate to undesirable bending moments. For example, the axes knock-out rods 25 illustrated in FIG. 2a are slightly above and below the axes of the ejector pins 30 by similar amounts.

One piece injection molds may be quite heavy because of their size making it desirable to split up the mold into easier to handle segments or modules. For example, if the mold could be split into four segments in some cases the weight may be reduced to a point at which each segment or module could be guided and supported by hand during installation without requiring awkward lifting equipment. In multi-level stack molds, such as the two-level stack mold illustrated in FIG. 2b, splitting up the mold into segments would get around the problem of how to remove the right hand core 102 and cavity 112 without having to further dismantle the molding apparatus to first remove the sprue bar 116 extending through the core 102 and cavity 112.

Prior pin ejector mold assembly designs do not lend themselves well to being segmented or modularized because of the interrelationship between the machine ejector box components, the ejector plate, the ejector pins and the openings through the core for receiving the ejector pins. Dividing the mold base up into corresponding segments for replacement with the mold core would increase the mold base cost and in many cases there may not be suitable knock-out rod placement points to enable the segmented ejector plate to be pushed evenly without undesirable bending moments being applied to the ejector plate or ejector pins which cause seizing and excessive wear. Merely dividing the core into segments to enable substitution of a core for different (or event the same) part presents the problem discussed above with ejector pin placement which is already fixed in location in the mold base. The pins are also easily damaged and difficult to fit without damage because of the absence of chamfered ends. Damage to the ejector pin ends will result in undesirable flash on the finished part.

In multi-level stack molds which require pin ejector assemblies remote from the machine ejector box further problems have to be considered with the ejector plate actuating mechanism. If space permits, which is often not the case with two or four level stack molds, hydraulic or pneumatic cylinders can be mounted within the mold base to act on suitable points on the ejector plate. Pneumatic cylinders require balancing of the lines in the plates and may not have the force or degree of control desired for some applications. Hydraulic cylinders may leak onto the mold face. In either case, optimum cylinder locations for one product are unlikely to agree with those for another product.

Particularly in cases where space is limited, the ejector plate actuating mechanism may be mounted to act on opposite edges of the ejector plate. Although this reduces the required depth of the mold box (as room does not have to be provided behind the ejector plate for an actuating mechanism), the ejector plate is subjected to bending moments because the ejector plate is not being pushed directly behind the ejector pins and the pushing force on the ejector plate is not being applied evenly to several points across the ejector plate. This may require a thicker or reinforced ejector plate. Such an arrangement would be unsuitable for a modular or segmented mold having a segmented ejector plate as there would be no convenient mechanism for applying force to opposite edges of the ejector plate without giving rise to undesirable bending moments.

It is an object of the present invention to provide a modular pin ejection mold assembly which may be readily installed and removed from a molding press in a minimum amount of changeover time without requiring disconnection of fluid or electrical connections.

It is an object of the present invention to provide a modular pin ejection mold in which the ejector plate and pin assembly are removable with the mold core and do not require disconnection from an ejector box on the molding press.

It is an object of the present invention to provide modular pin ejection mold having ejector assembly that occupies a minimum amount of space behind the mold face, applies force at a point or points behind the ejector plate to minimize bending of the ejector plate and does not rely upon an ejector box within the molding press for actuation.

It is an object of this invention to provide a modular pin ejection mold which is usable with multi-level stack molds.

It is an object of the present invention to provide a modular pin ejection mold which eliminates the constraint of fixed ejector pin placement in changing from one part to another.

SUMMARY OF THE INVENTION

A modular injection mold assembly having a core part with an ejector box side securable to a mold base and a core side presenting a first mold face on an outer surface thereof and a cavity part presenting a second mold face mountable opposite said first mold face. An ejector assembly is mounted within the ejector box side of the core part and has a base member and at least one ejector pin extending from the base member through the core. The ejector assembly is movable relative to the core between a retracted position in which an outer end of each of the ejector pins forms part of the first mold face and an extended position in which the outer ends of each of the ejector pins protrudes from the first mold face. The base member of the ejector assembly further includes a cam follower for causing the ejector assembly to move from the retracted position to the extended position in response to input from a cam mounted to either the mold base or the core. The mold assembly is removable from the mold base as a unit with the ejector assembly and exchangeable for another mold assembly without removal of the ejector pins from the core part.

DESCRIPTION OF DRAWINGS

Preferred embodiments of the invention are described in detail below with reference to the following drawings in which.

DESCRIPTION OF PREFERRED EMBODIMENTS

Figure 3:
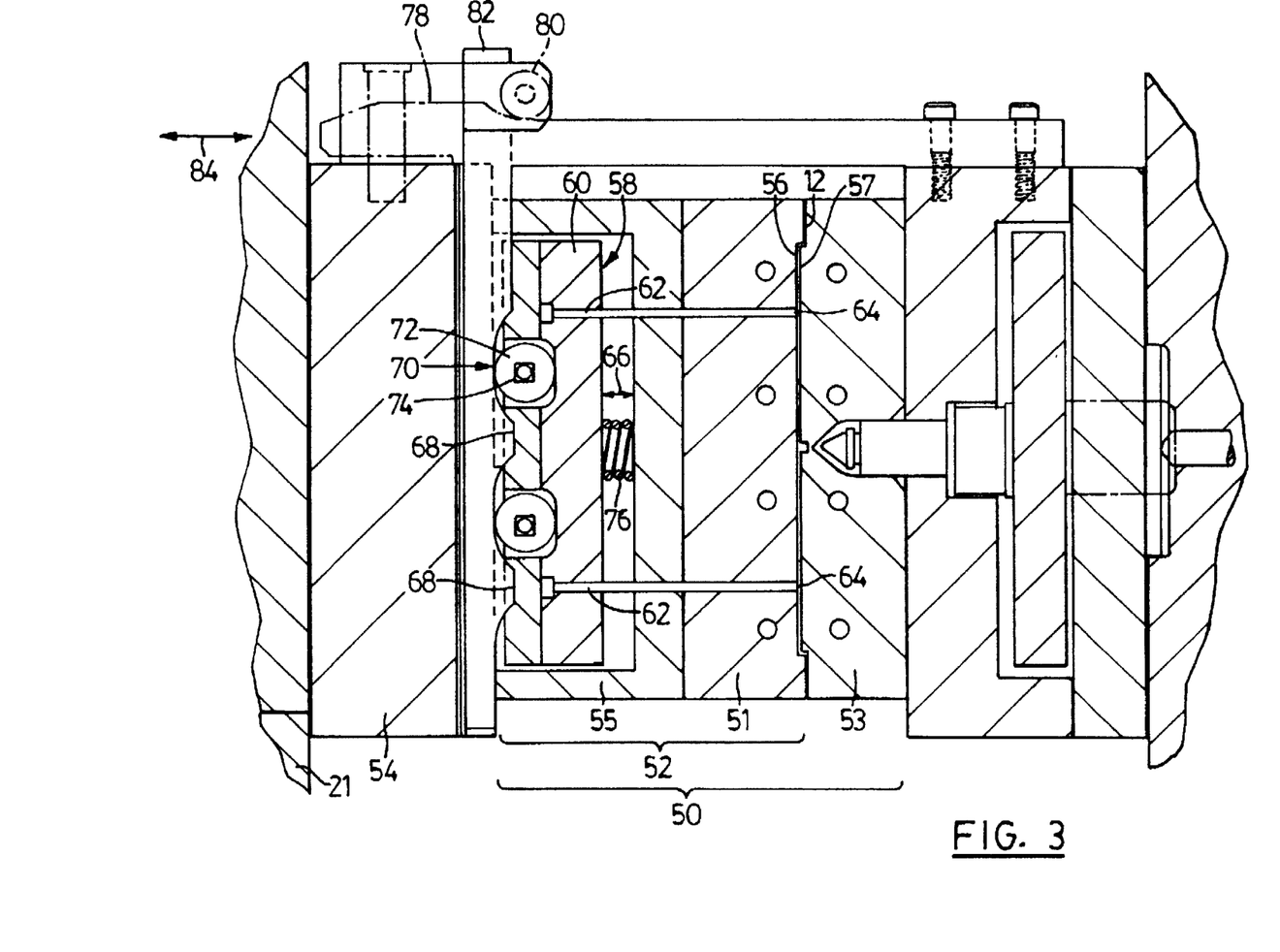
FIG. 3 is a cross-sectional view taken on line 3—3 of FIG. 1 of a modular injection mold assembly according to the present invention mounted in a molding machine.
Figure 3A:
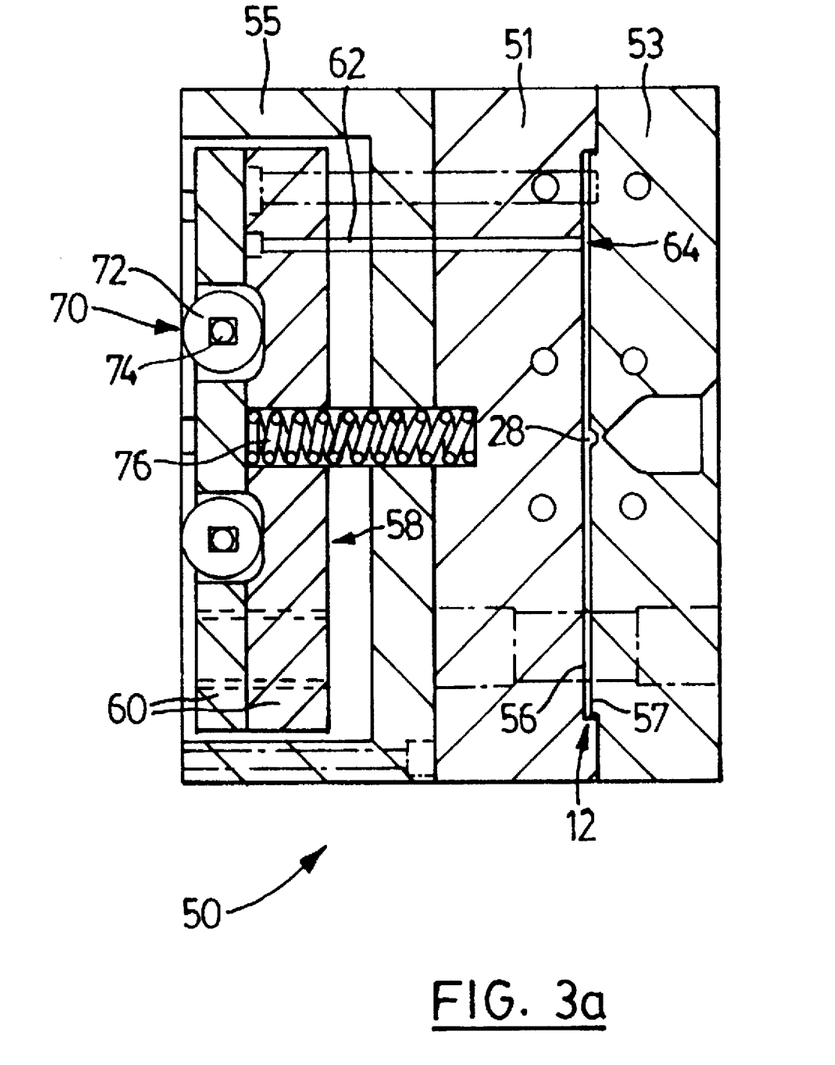
FIG. 3a is a cross-sectional view through a module of a modular injection mold assembly according to the present invention.

A modular injection mold assembly ("mold assembly") according to the present invention is generally identified by reference 50 in FIG. 3. FIG. 3 illustrates the mold assembly 50 mounted in a molding machine. FIG. 3a illustrates the mold assembly 50 on its own. The overall assembly is similar to the prior art assembly 10 in FIGS. 1 and 2a in that it has a core part 52 securable to a mold base 54. Accordingly, FIG. 1 is used to show the section lines for both FIGS. 2 and 3. The ejector assembly and its actuating means are however substantially different in significant respects as described below.

According to the present invention, the core part 52 has a core side 51 having a first mold face 56 to the right as illustrated in FIG. 3. Opposite the core part 52 is a cavity part 53 having a second mold face 57 opposite the first mold face 56. An ejector assembly 58 is mounted within an ejector box side 55 (to the left as illustrated) of the core part 52. The ejector assembly 58 includes a base member 60 with a pair of generally cylindrical ejector pins 62 having respective outer ends 64 extending from the base member 60 through the ejector box and core sides, 55 and 51 respectively of the core part 52. Although FIG. 3 illustrates two ejector pins 62, in practise, the actual number and arrangement of ejector pins 62 will of course depend on the shape of the part (or parts) 12 being molded.

The ejector assembly 58 is illustrated in its retracted position wherein the outer ends 64 of the ejector pins 62 form part of the first mold face 56. The ejector pins 62 are illustrated with their respective outer ends 64 flush with the first mold face 56. Although this would be the case in many installations, in some instances it may be preferable to have the ends 64 slightly recessed or slightly projecting with respect to the first mold face 56. The ejector assembly 58 is movable in the directions shown by arrows 66 from the retracted position to an extended position (toward the right in the illustration) wherein the outer ends 64 of the ejector pins 62 extend from the first mold face 56. In moving toward the extended position, the outer ends 64 of the ejector pins 62 would press the part 12 away from the first mold face 56 to strip the part 12 from the mold part 52. Movement of the ejector is effected by the action of cam lobes 68 on cam followers 70 mounted to the base member 60 of the ejector assembly 58. To minimize wear the cam follower 70 may be a roller 72 mounted on a shaft 74 secured to the base member 60.

Movement of the cam lobe 68 in an upward direction as illustrated in FIG. 3 will cause the ejector assembly 58 to move to the right toward the extended position. A biasing member such as a spring 75 may be used to urge the ejector assembly toward its retracted position.

Movement of the cam lobe 68 may be effected by any suitable means. One such means is illustrated in FIG. 3 where a second cam 78 acts on a roller 80 at the end of a shaft 82 extending from the cam lobes 58. Relative lateral movement between the second cam 78 and the roller 80 in the direction indicated by arrows 84 will cause vertical movement of the shaft 82 and in turn the cam lobes 68. The relative lateral movement may be achieved by holding the cam 78 stationary while the core part 52 is moved in the direction of arrows 84 as the injection mold is opened and closed. Alternatively, a hydraulic cylinder or other actuating means may be used. If mold movement is used for actuation, then it may be necessary to use a bell crank such as illustrated at reference 86 in FIG. 4 or another means to translate mold movement into the appropriate amount of movement of the cam lobe 68.

In the embodiment illustrated in FIG. 3, the cam 68 and shaft 82 are shown as being mounted to remain with the mold base 54. For the purposes of this specification such an arrangement is referred to as "mounted to" the mold base and is intended to cover variants wherein the cam 68 and shaft 82 are mounted adjacent the mold base 54 so as to remain with the mold base 54 upon removal of the core. An example of such a variant would be securing the shaft 82 to the movable platen 21 rather than the mold base 54. An advantage to this arrangement is that the mold base 54 can be changed without having to disconnect the actuating mechanism for the cam lobe 68. A disadvantage to this arrangement is that if the replacement mold part 52 is for a significantly different part 12, the configuration of the ejector assembly 58 may in some applications require different placement of the cam lobes 68 in which case the combination of cam lobe 68 and shaft 82 would have to be substituted for another suitable unit.

Figure 4:
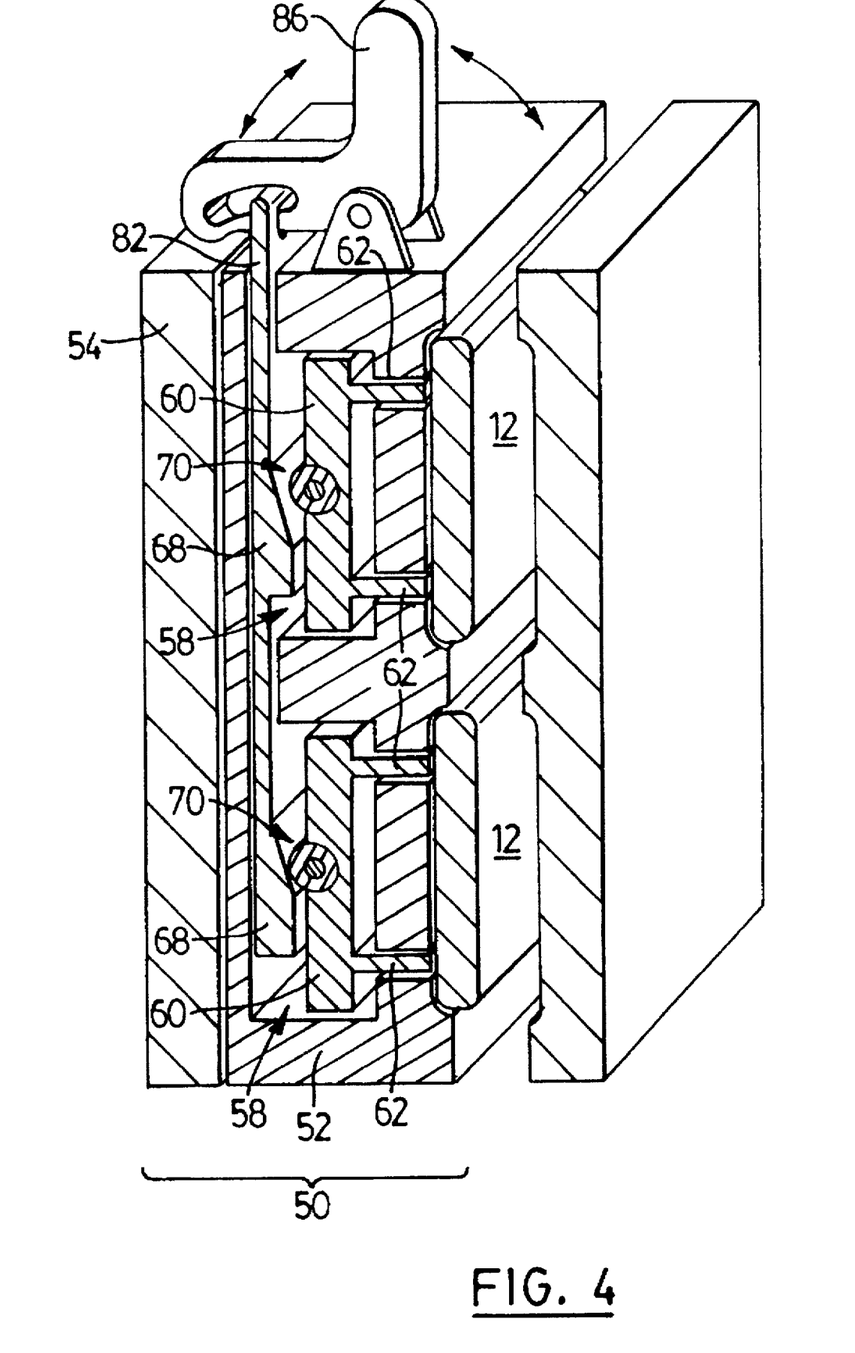
FIG. 4 is a cut-away perspective view illustrating an alternate embodiment of a module of a modular injection mold assembly according to the present invention.

As illustrated in FIG. 4, the shaft 82 may be provided with a plurality of cam lobes 68 and may be mounted to the core part 52. In this arrangement, each core part 52 would be supplied with matching ejector assemblies 58, cam lobes 68 and shaft 82 which remain with the core part 52. Accordingly, there would be no restriction on the placement of the cam lobes 68 to accommodate the cam followers 70.

A feature of the mold assembly 50 illustrated in FIG. 4 is the use of two ejector plates 60. As each of the ejector plates 60 moves independently it is not necessary to cause them to move simultaneously. As illustrated in FIG. 4, the placement of the cams 68 will cause the lower ejector plate 60 to move toward its extended position before the upper ejector plate 60, accordingly the ejector plates 60 will move sequentially rather than simultaneously.

An advantage to the cam actuated ejector assembly 58 of the present invention is that force is applied to the ejector plate 60 in the vicinity of the ejector pins 62. In the prior art designs where ejector plate activation is carried out by externally mounted cylinders not connected to a knock-out plate, force is applied to the edge of the ejector plate 34 therefore requiring a rather heavy ejector plate 34 to avoid bending. A further advantage to the ejector assembly 58 of the present invention is that it allows the use of a plurality of ejector plates 60 thereby enabling sequential actuation of the ejector assemblies 58 such as described above with reference to FIG. 4. Multi-stage ejection is also made possible.

Another advantage of the present invention is that it enables exchanging one mold assembly (i.e. a core and cavity set) for another without removal of the mold base. This is beneficial in avoiding the necessity to purchase a mold base for each core, in avoiding having to arrange parts in a new core to correspond to existing ejector pin placement and in eliminating the time required to change mold bases when a mold core is to be exchanged. Accordingly modular injection mold assemblies according to the present invention can be exchanged quickly without disconnecting electrical or fluid connections thereby making shorter product runs more economically viable.

As illustrated, the actuating mechanism can be fully mechanical and therefore self-timing as it may be constrained to correspond to mold joinder and separation.

The ejector assembly 58 of the present invention requires a minimum amount of space and can therefore be adapted not only to conventional molds but also to two level and four level stack molds.

Force is evenly applied to the base 60 of the ejector assembly 58 at a location or locations which are generally centralized with and behind the ejector pins 62. The mold assembly of the present invention is therefore not limited to the machine knock-out positioning which could lead to an unbalanced arrangement in which moments are placed on the ejector assembly 58 as a result of force being applied to an edge of the base 60. Accordingly, the ejector assembly 58 is essentially self-contained and does not require a force to be applied to opposite edges to avoid undesirable bending moments which would tend to cock the ejector assembly, cause jamming and accelerate wear.

Figure 5:
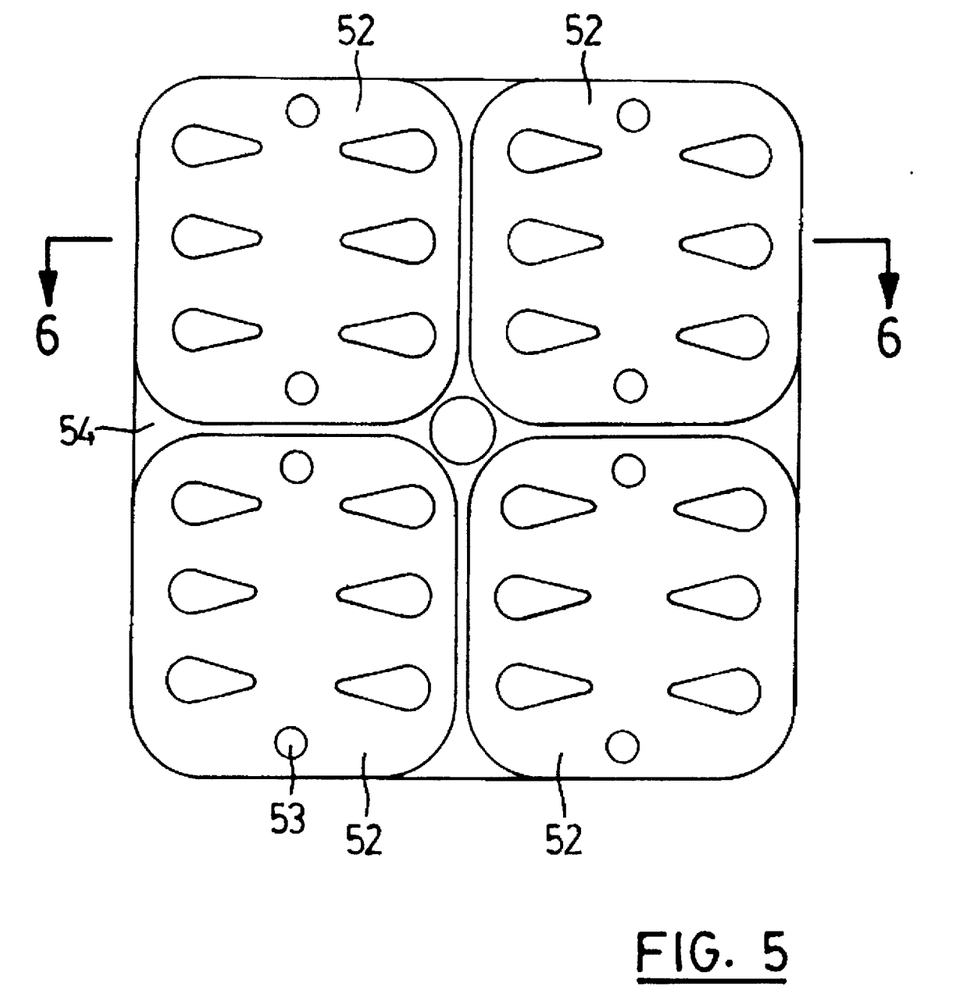
FIG. 5 is a plan view of the core face of a mold made up of a plurality of modular injection molding assemblies according to the present invention.

As the ejector assembly 58 of each mold assembly 50 does not require actuation from opposite edges, the mold assemblies 50 can be of any desirable size and a mold can be made up of a plurality of mold assemblies 50. The core face of such an arrangement is illustrated in plan in FIG. 5 and sectionally in FIG. 6. As illustrated in FIG. 5, the mold is made up of four mold parts 52 securable to the mold base 54 by fasteners 53. This configuration is advantageous for large molds because it divides the overall mold, which may be very heavy and awkward to handle into smaller and lighter individual modules of a readily handled size and weight. Furthermore, in the case of a two-level stack mold, the mold assemblies 50 could be removed from around a central sprue (see reference 116 in FIG. 2b) without requiring disassembly of the entire mold to bypass the sprue bar 116.

Figure 6:
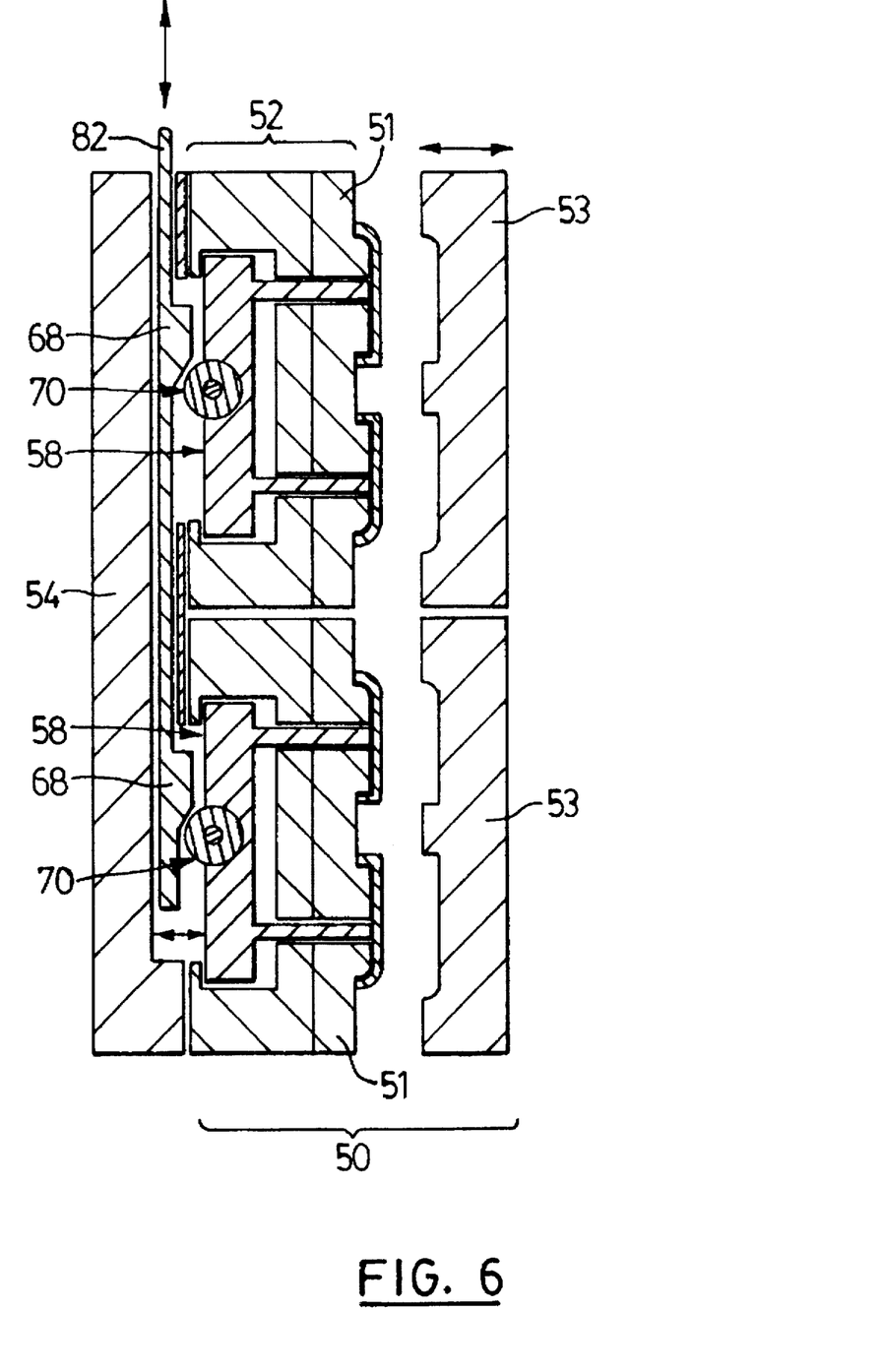
FIG. 6 is a cross-sectional view taken on line 6—6 of FIG. 5 and also showing a corresponding set of mold cavities; and, FIG. 7 is a cross-sectional view illustrating the use of mold assemblies according to the present invention in a multi-level stack mold.

As shown in FIG. 6, which also illustrates the respective mold cavities 53, a single shaft 82 may be used having a separate cam lobe 68 for each of the ejector assemblies 58. The shaft 82 remains with the mold base 54. As the lobes 68 are generally centrally located, the cam may be used with other mold assemblies 50 having base members with centrally located cam followers 70.

A very significant advantage to the present invention is its application to multi-level stack molds. Tooling costs for multi-level stack molds are quite high as compared to conventional non-stacked molds because of the requirement to provide mold bases having heaters, conduit for molten plastic, conduit for cooling water, ejector actuators and means to open and close the mold. Heretofore, for pin ejected parts, each mold assembly required all of the above components and was expensive to make and cumbersome to change. With the present invention, all of the above components can remain in place on the molding press with merely the mold assemblies 50 being interchanged.

Also, the positions of the ejector pins 62 are not fixed in position or number by the mold base. This allows a great deal of flexibility in the type and layout of parts in the mold assembly. For example, if a new part is smaller than a previous one, more cavities can be added to the cavity side 51 of the mold assembly as there is no restriction imposed by the cavity spacing or ejector pin location of the previous part.

Figure 7:
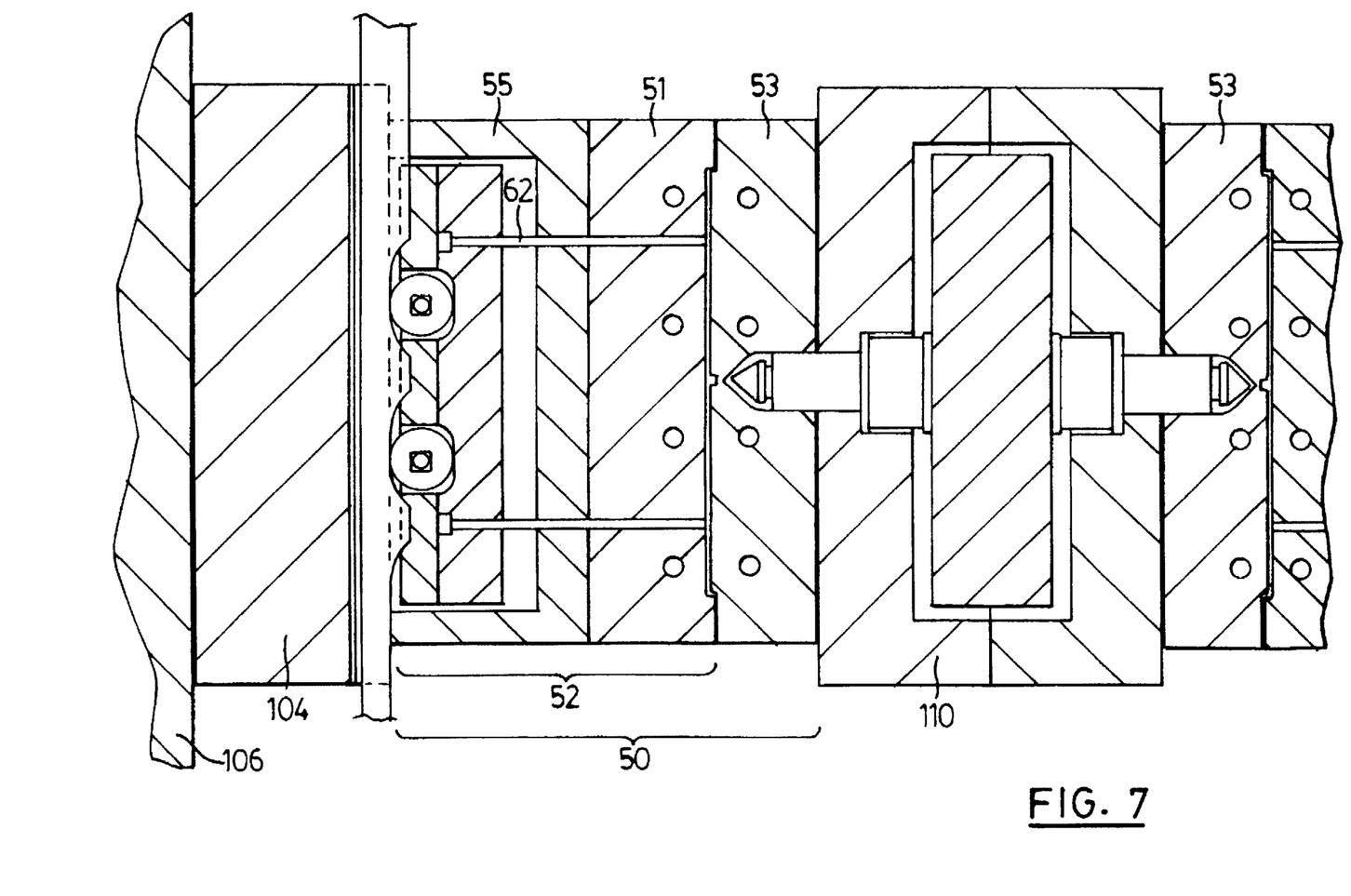

FIG. 7 illustrates a mold assembly 50 mounted in a multi-level stack mold. The core part 52 is mounted to the mold base 104 which in turn is mounted to the movable platen 106. A cavity part 53 is mounted on both sides of an intermediate member 110.

The above detailed description should be interpreted as being illustrative rather than restrictive. Modifications to the specific embodiments described above may be apparent to those of relevant skill while staying within the spirit and scope of the invention as described by the claims set out below.

I claim:

1. A modular injection mold assembly for a molding press, said mold assembly comprising:

a core part with an ejector box side securable adjacent to a mold base and a core side presenting a first mold face on an outer surface thereof;

a cavity part presenting a second mold face mountable opposite said first mold face;

an ejector assembly having a base member mounted within said ejector box side of said core part and at least one ejector pin extending from said base member through said core side;

said ejector assembly being movable relative to said core side between a retracted position wherein an outer end of each said ejector pin forms part of said first mold face and an extended position wherein said outer end of each said ejector pin protrudes from said first mold face;

said base member of said ejector assembly further including a cam follower slidably engaging a cam mounted to one of said mold base and said core part, part for causing said ejector assembly to move between said retracted position and said extended position in response to input from said cam; and said mold assembly being removable from said molding press base as a unit with said ejector assembly and exchangeable for another mold assembly without removal of said ejector pins from said core part.

2. A modular injection mold assembly as claimed in claim 1 having a plurality of said ejector assemblies.

3. A modular injection mold assembly as claimed in claim 2 wherein said cam having a separate lobe corresponding to each said cam follower.

4. A modular injection mold assembly as claimed in claim 3 wherein said lobes are arranged to move said cam followers on said ejector assemblies sequentially.

5. An injection molding assembly comprising a plurality of modular injection mold assemblies as claimed in claim 1, 2, 3 or 4 mounted on a single mold base;

said mold base has at least one set of cams mounted thereto; each said set of cams operates the ejector assemblies of more than one of said plurality of modular injection mold assemblies.

* * * * *